Nov. 3, 1970  O. DORFMANN  3,537,230
BOX LOADING MACHINE
Filed April 9, 1968   13 Sheets-Sheet 1
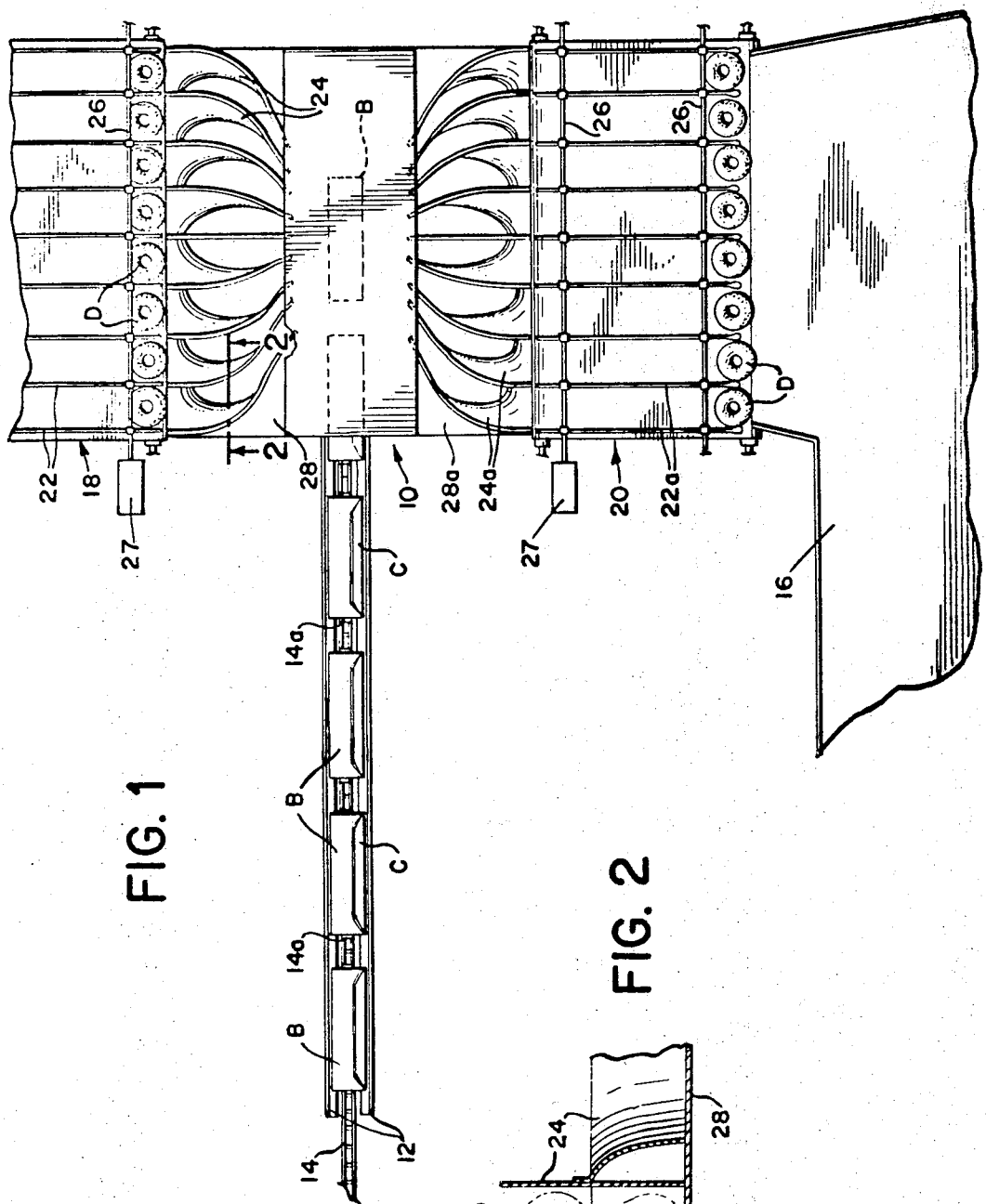
INVENTOR
OSKAR DORFMANN
BY
*Darby and Darby*
ATTORNEYS

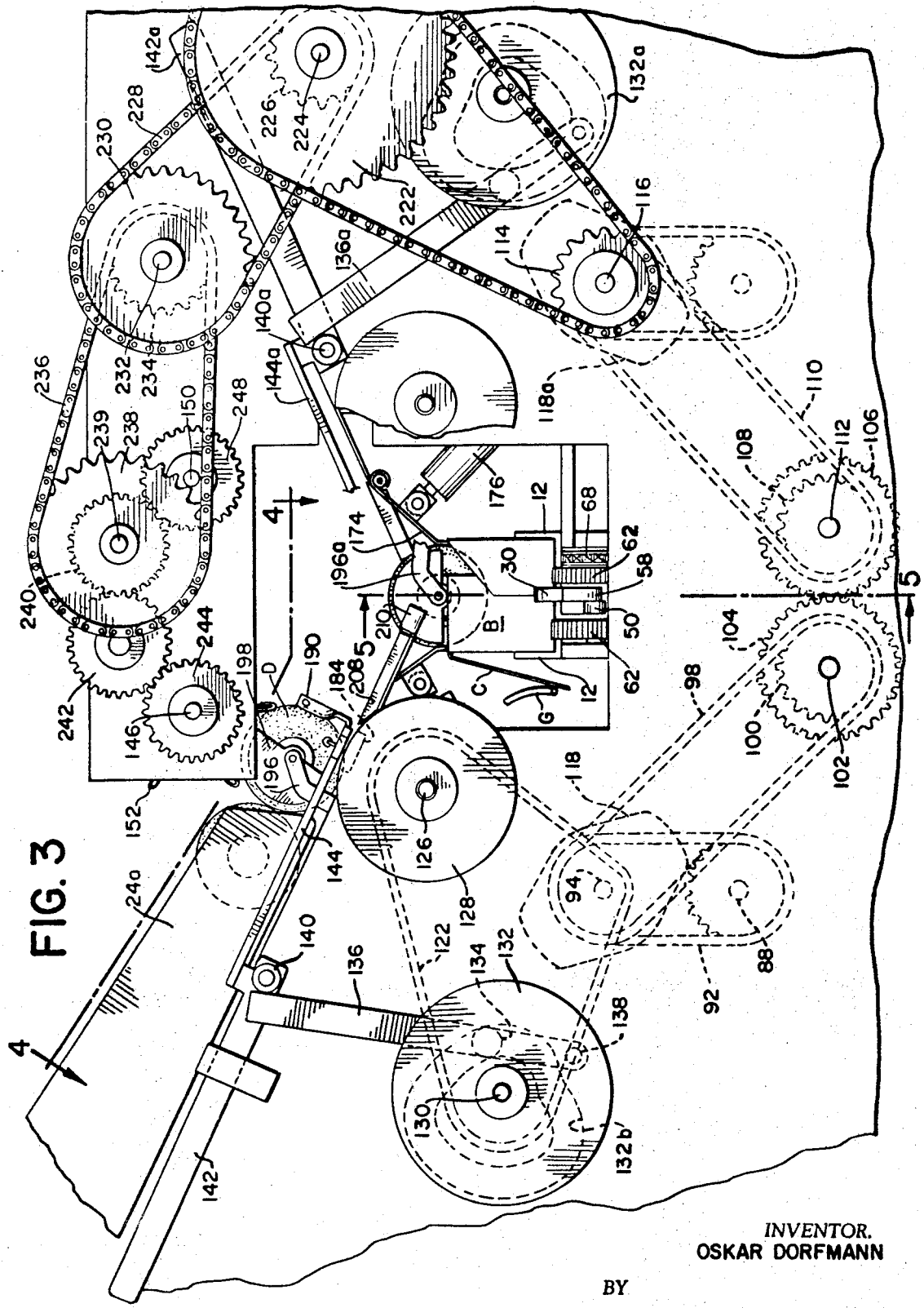

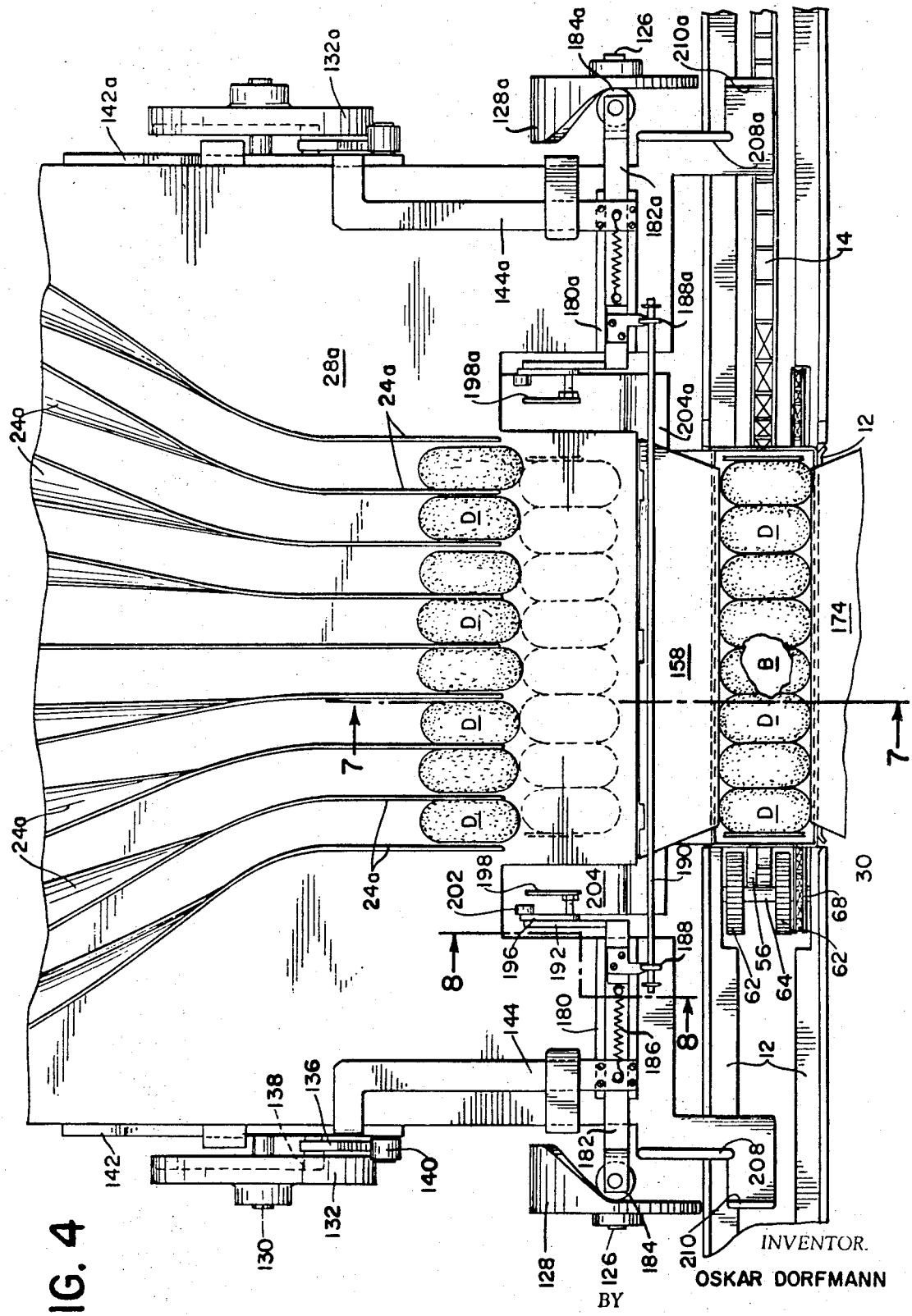

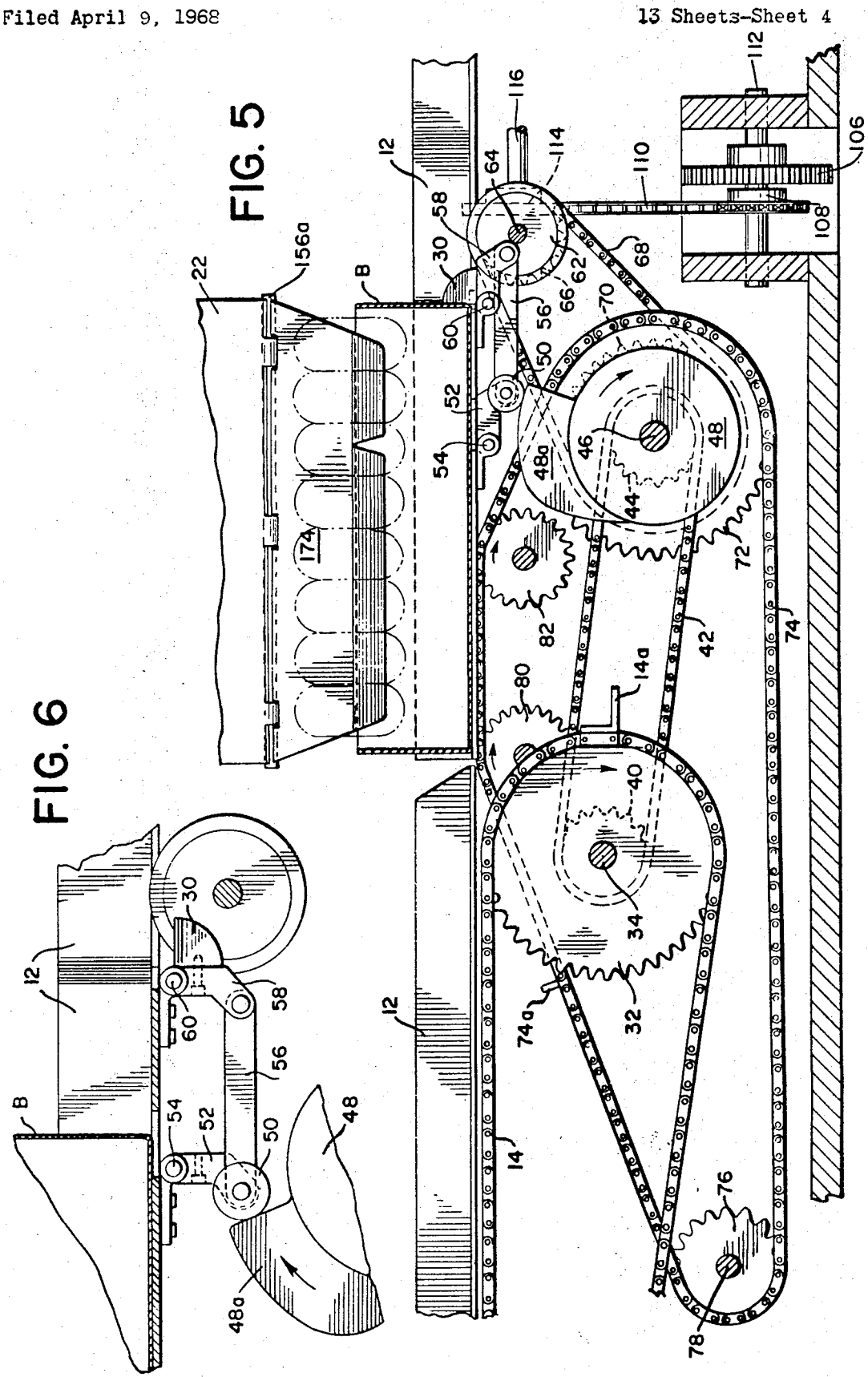

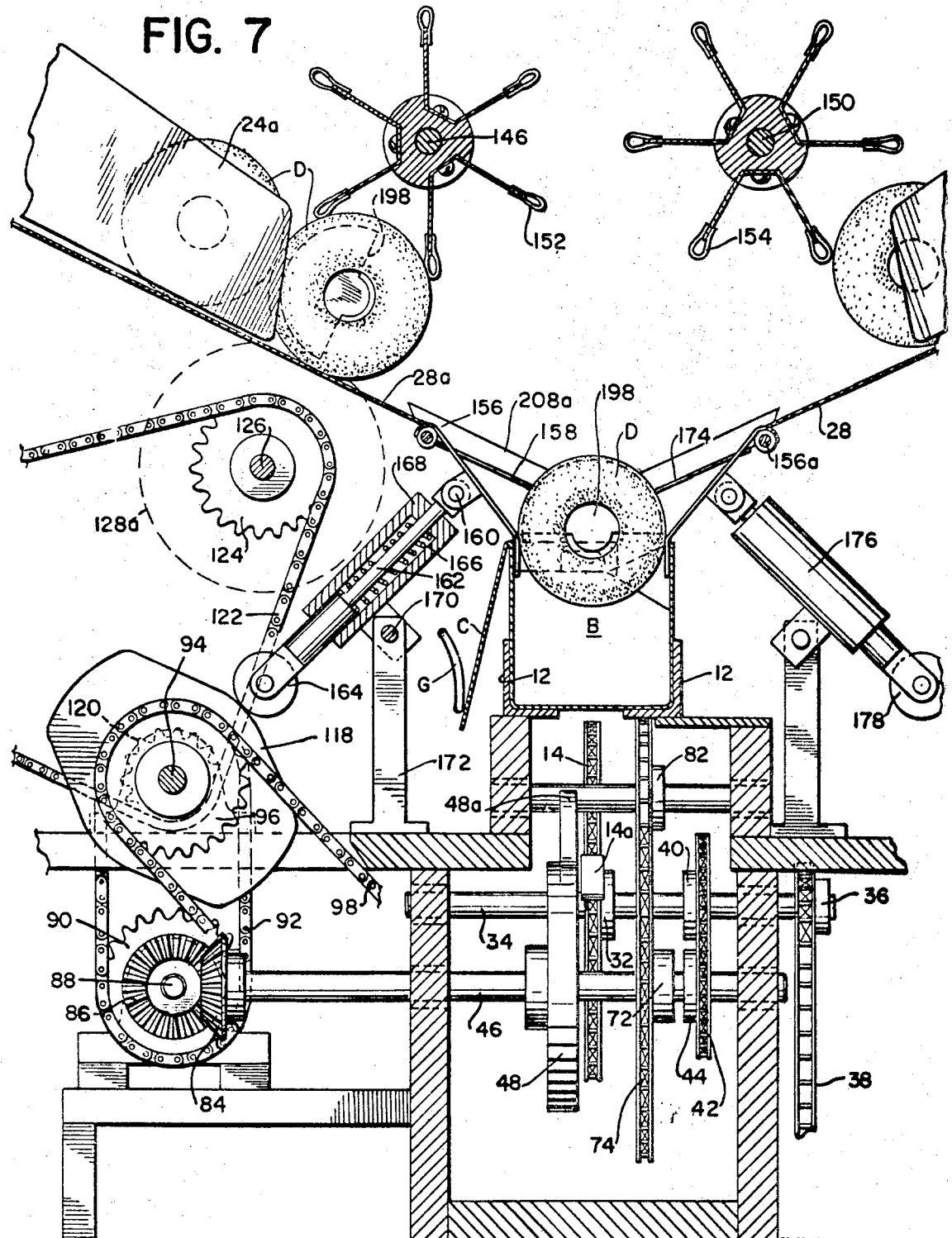

Nov. 3, 1970   O. DORFMANN   3,537,230
BOX LOADING MACHINE

Filed April 9, 1968   13 Sheets-Sheet 7

INVENTOR.
OSKAR DORFMANN

BY

*Darby and Darby*
ATTORNEYS

Nov. 3, 1970     O. DORFMANN     3,537,230

BOX LOADING MACHINE

Filed April 9, 1968     13 Sheets-Sheet 9

Nov. 3, 1970          O. DORFMANN          3,537,230

BOX LOADING MACHINE

Filed April 9, 1968          13 Sheets-Sheet 13

INVENTOR
OSKAR DORFMANN

BY *Darby and Darby*
ATTORNEYS

United States Patent Office 3,537,230
Patented Nov. 3, 1970

3,537,230
BOX LOADING MACHINE
Oskar Dorfmann, North Bergen, N.J., assignor to Federal Carton Corporation, North Bergen, N.J., a corporation of New York
Continuation-in-part of application Ser. No. 532,696, Mar. 8, 1966. This application Apr. 9, 1968, Ser. No. 719,970
Int. Cl. B65b 5/06, 35/30, 39/12
U.S. Cl. 53—124                               11 Claims

ABSTRACT OF THE DISCLOSURE

A machine for placing groups of compressible articles, such as donuts, in boxes. The donuts are supplied to each of two duplicate mechanisms in horizontal position, rotated to stand on edge, assembled in groups, axially compressed and while held by pressure members transferred from the assembly point to a box at a loading station. In one embodiment the two duplicate mechanisms are out of phase and boxes are alternately loaded from opposite sides; in the second and preferred form either the above-described mode of operation may be performed or the two mechanisms may be operated in phase and a double row of articles, one from each of the duplicate mechanisms, simultaneously placed in a wide box.

This application is a continuation-in-part of my prior application Ser. No. 532,696 filed Mar. 8, 1966, and assigned to the assignee of this application, now abandoned. It includes a second embodiment of the invention arranged to fill boxes adapted to contain 12 or 16 donuts and additionally includes improved gating means, improved means for feeding donuts to the gating means, improved pressure means and means for adjusting the phase relationship of the two substantially duplicate mechanisms so that boxes adapted to contain six or eight donuts may be loaded from opposite ones of the duplicate mechanisms alternately or boxes containing twelve or sixteen donuts in two rows may be loaded, each of the duplicate mechanisms depositing donuts in one of the two rows of the box simultaneously.

In the past, machines have been devised for loading soft compressible articles such as buns, rolls or donuts into boxes but these machines had the disadvantage that the means for placing of the articles on edge in order to assemble a group were complex, the means for gating the group of articles for alignment purposes were not satisfactory, the mode of loading, which attempted to compress the articles in both radial and axial directions simultaneously, damaged the articles and no provision was made to load articles in either two rows in wide boxes or in a single row in narrow boxes as desired, without major machine modification.

The objects and features of the machine of my invention will be obvious from the description of the embodiments and modification thereof when that description is considered in connection with the annexed drawings in which:

FIG. 1 is a somewhat diagrammatic plan view of a first embodiment of the machine illustrating its general arrangement and the manner in which boxes are presented successively to the loading machine and the articles are delivered to the machine;

FIG. 2 is a detailed cross-sectional view taken on the line 2—2 of FIG. 1;

FIG. 3 is an enlarged detailed view of the mechanism looking at it from the right-hand side with respect to FIG. 1;

FIG. 4 is a sectional view on the line 4—4 of FIG. 3;

FIG. 5 is a cross-sectional view taken on the line 5—5 of FIG. 3;

FIG. 6 is an enlarged detailed view of the box positioning mechanism showing some parts in cross section;

FIG. 7 is a cross-sectional view taken on the line 7—7 of FIG. 4;

Figure 11:
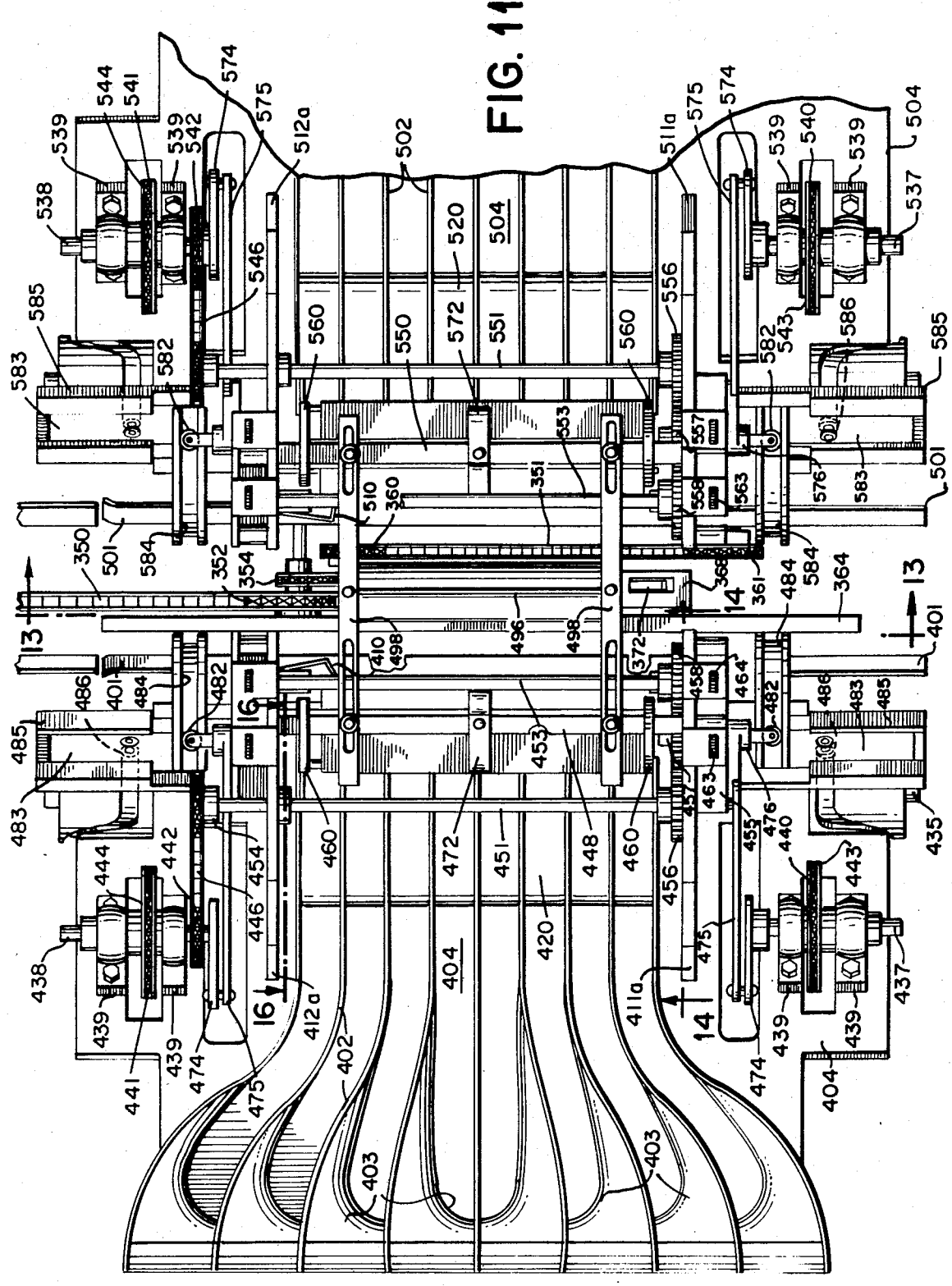
FIG. 11 is a top-plan view of a second and preferred embodiment of the invention.

It will be helpful in reading the drawings in this case to realize that looking at FIGS. 1 and 11 the machine is duplicated on opposite sides of a vertical plane on the axis of the box feeding rails. The machine is substantially a duplicate on opposite sides of a vertical central plane including the longitudinal axis of the box feeding mechanism. In operation the machine of the first embodiment will be timed to deliver groups of articles first from one side of the axis of the box feeding machine and then from the opposite side so that alternate boxes are loaded from opposite sides of the machine, while the machine of the second embodiment may operate in this manner or may deliver groups of articles simultaneously to a single two-row box, loading such box from both sides.

Referring now to FIGS. 1–10, the loading position is at the center of the machine, as indicated generally at 10 in FIG. 1. The boxes B are delivered to the loading station along a pair of L-shaped tracks 12, on which they are caused to slide by means of a power driven conveyor chain 14. The boxes are of a well known type, assembled from cut and scored blanks of cardboard, for example, and are delivered in any suitable manner onto the rails 12, so as to open upwardly with the cover C standing upwardly. As these boxes are moved into the loading position and as is well understood in the art, the covers C engage a fixed guide arm G, see FIG. 3 and 7, which causes the cover to be rotated counterclockwise into a downwardly extending position. A belt conveyor 16 is arranged to carry the donuts D while in a horizontal plane from any suitable loading station in a direction parallel to the feed of the boxes B, see FIG. 1, and then to be guided so as to move in a direction towards the loading center 10 of the machine. Only one of the conveyors 16 is shown in FIG. 1, the other one being in a corresponding position at the other side of the machine which is to receive the donuts from each side, as will be explained in more detail later.

The donuts are delivered from the conveyors 16 at each side of the machine onto aligned belt conveyors 18 and 20, which are inclined downwardly to a lower level, as can be seen in FIG. 7. Lying in vertical planes just above the conveyors 18 and 20 are a series of vertical partitions 22 and 22a which are mounted on supporting rods 26, one of each pair of which is connected to any suitable form of vibrating mechanism 27. The vibrating mechanism 27 will serve to vibrate the vertical walls sufficiently so as to insure against the sticking of the articles if they are, for example, chocolate coated donuts which might have a tendency to otherwise drag along the partition faces. As shown, particularly in FIG. 1 and 2, the partitions 22 and 22a are provided with curved extension 24 and 24a, which will cause the articles to be gradually rotated from a horizontal plane into vertical planes so that they will arrive in the relative position shown in FIG. 4 at the ends of the partitions.

The plates 28 and 28a are positioned under the partition ends 24 and 24a to provide a foundation for the articles coming from conveyors 18 and 20. As shown, for example, in FIG. 7, the vertically positioned donuts D rest on the plates 28 and 28a.

As shown in FIG. 5, the box conveyor 14 is provided with properly spaced lugs 14a which can project upwardly between the rails 12 and engage successive boxes so as to carry them along to the loading station, see also FIG. 1. The lugs 14a will move the box B to the loading position in cooperation with a stop 30 which will place the box in alignment with a group of the articles to be loaded, see also FIG. 4.

The chain conveyor 14 is driven by means of a chain 38, see FIG. 7, which in turn is driven, for example by means of an electric motor. This chain drives a sprocket wheel 36 mounted on a shaft 34, on which is also mounted a sprocket wheel 32 which drives the chain conveyor 14. It will be noted that the parts are so proportioned that when a lug 14a delivers the box B against the stop 30 it will pass out of interference with the box and leave it standing in this position which is the loading station. Also mounted on the shaft 34 is a sprocket 40 which is connected by a chain 42 to a sprocket 44 on the shaft 46. Secured to this shaft is a cam 48 having a camming projection 48a which cooperates with a cam follower wheel 50 journaled on the pivotal connection between the levers 52 and 56, see particularly FIG. 6. The lever 52 is pivotally mounted at 54 on the rails 12. The other end of the lever 56 is pivotally connected to a lever 58 which in turn is pivotally mounted at 60 on the rails 12. The stop 30 is removably mounted on the lever 58, which is the position for stopping boxes B of a size to hold 8 donuts. Since this machine is also capable of loading boxes which will hold 6 donuts, the actuating mechanism for the stop 30 is proportioned in size so that the stop 30 can be transferred from the link 58 to the link 52, in which case it can serve to position a 6 donut box.

Also secured to the shaft 46 is a sprocket 70, which serves to drive a chain 68 and in turn a shaft 64 through the sprocket 66. The shaft 64 is journaled under the rails 12, see FIGS. 3 and 6, and has mounted thereon a pair of rollers 62, whose peripheries project above the sliding surfaces of the rail 12 so as to be able to engage the under surface of the box B to move it away from the loading station, as will be explained later. Also mounted on the shaft 46 is a sprocket 72 which engages a conveyor chain 74. This chain extends around an idler sprocket 76 on the shaft 78 and is supported by a pair of sprockets 80 and 82 positioned so that for a short distance the chain 74 will travel in a horizontal plane just below the bottom of the box B and between the rails 12. The chain 74 is provided with an abutment 74a which, in proper timing, engages the end of the box B to move it to a position where it will be engaged by the roller 62, which can then move it completely from the loading station. As would be expected, the mechanism for positioning to stop 30 would be actuated in proper timing, so as to release the box for movement by the chain 74 and its abutment 74a.

Turning to FIG. 7, it will be seen that a bevel gear 84 is secured to one end of the shaft 46 so as to cooperate with a bevel gear 86 on the shaft 88. Secured to this shaft is a sprocket 90 which serves to drive a chain 92, which in turn drives a sprocket 96 mounted on the shaft 94. Another sprocket similar to the sprocket 96 drives a chain 98 which in turn drives a sprocket 100 on the shaft 102, see FIG. 3. Secured to the shaft 102 is a gear 104 which meshes with the gear 106 secured to the shaft 112. This shaft is provided with a sprocket 108 which serves to drive the chain 110 and through it a sprocket 114 secured to a shaft 116. At this point attention is again drawn to the fact, referring to FIG. 3, that the operating mechanism on each side of a vertical central longitudinal plane through the loading station is duplicated, that is, it is the same. Thus, the mechanism is all operated for a common drive source, the power flowing from shaft 34 to shaft 46 to shaft 88 to shaft 94 and then to shaft 102, from which it is transferred to shaft 112 through the gears 104 and 106. From there the power is delivered to a mechanism which is the duplicate of that about to be described for the left hand side of the machine. There is, however, as will be mentioned shortly, some additional mechanism at at the right hand side of the machine also driven through the same power path.

For the moment, however, returning to the left hand side of the machine and to shaft 94, it will be seen that it carries a cam 118 and a sprocket 120, see FIG. 7. This sprocket drives a chain 122, which in turn drives a sprocket mounted on the shaft 126. Mounted on this shaft is a cam 128, which can also be seen in FIG. 4. The chain 122 also passes around a sprocket mounted on the shaft 130, see FIG. 3, to which is secured a face cam 132 having a cam groove 132b. Operating in this cam groove is a cam follower 134 journaled on a lever 136, which is pivotally mounted at the fixed point 138, see FIG. 3. The upper end of the lever 136 cooperates with a roller 140 mounted on a pusher rod comprising the portion 142 and the offset portion 144, see FIGS. 3 and 4. At this point it will be well to emphasize, as will be clearer later in the description, as shown in FIG. 4, that the mechanism being described is duplicated at the other end of the machine. Thus, there is a corresponding cam 132a and a pusher bar 142a and 144a as well as the associated detailed mechanism shown for one side in FIG. 3.

Figure 8:
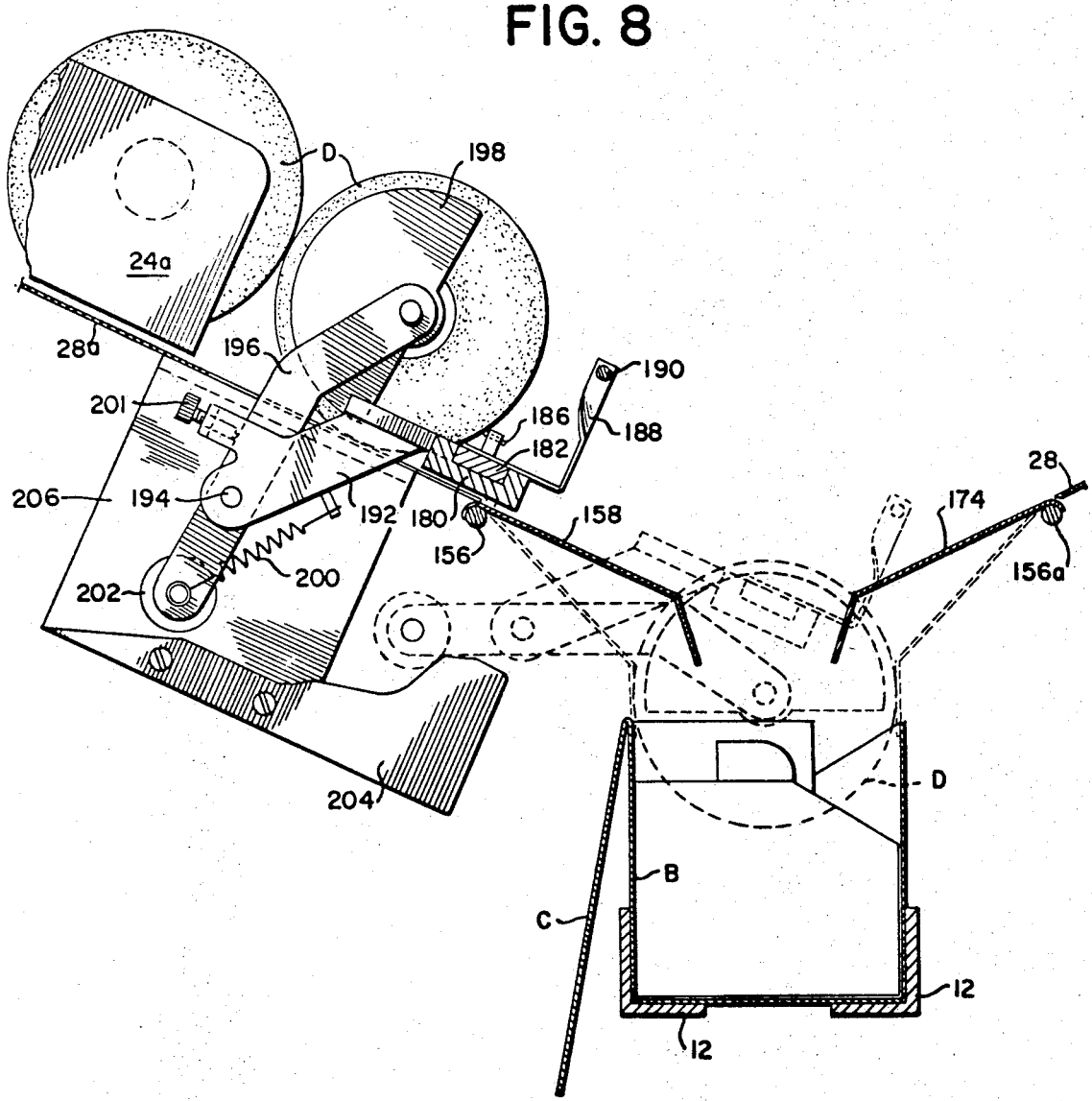
FIG. 8 is a cross-sectional view taken on the line 8—8 of FIG. 4.

Turning to FIGS. 4 and 8 it will be seen that there is secured to the end of the pusher bar section 144 a slide 182 which is mounted in a U-shaped guide 180. On the outer end of the slide 182 is a cam follower 184 which cooperates with the cam 128. The structure is the same at the other side, wherein the slide 182a is mounted in the U-Shaped guide 180a and is provided with the cam follower 184a which cooperates with the cam 128a. As seen in FIG. 4, the cams 128 and 128a are mounted on opposite ends of the shaft 126. A spring 186 is connected between the slide 182 and the end of the pusher bar 144 so as to urge the slide 182 in a direction to hold the cam follower 184 against the cam face. The same arrangement is provided at the other side of the machine. Mounted on the inner ends of the slides 182 and 182a are a pair of upstanding brackets 188 and 188a in which is mounted a rod 190, which extends across the path of movement of the donut groups towards the boxes.

Referring to FIG. 8 it will be seen that the slide 182 has a downwardly inclined arm 192 on which is pivotally mounted at 194 a bell crank lever 196. Secured to the upper end of this lever is a clamp plate 198 and on its lower end is journaled a cam roller 202. A tension spring 200 is connected between the roller end of the bell crank lever and a pin on the arm 192 so as to urge the lever 196 in a counter clockwise direction against an adjustable stop 201 mounted on the arm 192. Mounted on a bracket 206 is a face cam 204 over which the cam roller 202 may operate. Extending across the end of each of the plates 28 are the flaps 158 and 174, respectively, which are pivotally mounted on the rods 156 and 156a. These flaps can be seen in plan in FIG. 4.

As can be seen in FIGS. 4 and 7, there is a clamp plate 198a corresponding to the clamp plate 198. Although not shown in detail, there is an operating mechanism for the clamp plate 198a which is the same as that shown in FIG. 8 for the clamp plante 198

Looking again at FIG. 4 there is positioned on the frame of the machine a straight camming plate 208 and an outwardly displaced straight camming plate 210. These are duplicated at 208a and 210a on the other side of the machine.

As shown in FIG. 3, there is some additional mechanism at one side of the machine. It includes a drive chain 220 actuated by the sprocket 114 for driving a sprocket 222 secured to the shaft 224. Secured also to this shaft is a sprocket 226 which drives a chain 228 and through it a sprocket 230 an the shaft 323. This shaft is provided with the sprocket 234, which, in turn, drives a chain 236 and through it a sprocket 238 journaled on a shaft 239. Mounted on this shaft is a gear 240, which meshes with a gear 248 and a gear 242. This gear drives gear 244 mounted on shaft 146. Gear 248 is mounted on shaft 150. Referring to FIG. 7, it will be seen that mounted on the shafts 146 and 150 are indexing wheels or blades 152 and 154 dimensioned to control the movement of a group of donuts D as they leave the partition ends 24a. Referring to FIG. 4 it is noted that the indexing wheels or blades 152 and 154 extend across the full width of the guides 24a so that a group of particular donuts are simultaneously controlled by them.

Mechanism is provided for swinging the flaps 158 and 174 up and down from the position shown in FIG. 7 to the dotted position shown in FIG. 8. This is accomplished by means of a rod 162 which is pivotally connected at 160 to the flap 158 and is provided with a cam roller 164 at the other end which cooperates with the cam 118. The rod 162 passes through a guide 168 in which is mounted a compression spring 166. The guide 168 is pivotally mounted at 170 on a fixed standard 172. Briefly, the flap 174 has a similar arrangement including the guide 176 and the cam follower 178. This cam follower cooperates with the cam 118a see FIG. 3, which corresponds with the cam 118 on the other side.

While the operation of the first embodiment of the machine may be apparent from the above description a brief review should help to clarify it further. The articles to be boxed come into both sides of the machine on horizontal conveyors. Conveyor 16 is shown in FIG. 1 for one side of the machine, the other conveyor not being illustrated. The articles D are guided by this conveyor so as to move between the partitions 22a and on to the endless belt conveyor 20. As mentioned above the partitions can be vibrated to prevent sticking of the articles should they have that characteristic. The conveyor moves the articles D in their horizontal relationship into the curved guides 24a which simultaneously cause them to rotate into vertical parallel planes as they move downwardly into the range of action of the indexing wheels 152 and 154. In the case illustrated 8 of the articles D are thus assembled so as to rest against the rods, of which rod 190 is an example. This group of articles is now aligned with the clamp plates 198 and 198a, see FIG. 4. Cams 128 and 128a now cause the slides 182 and 182a to move towards each other to bring the clamp plates to the dotted positions shown in FIG. 4. In the case of donuts if they are oversize these clamp plates will compress them to a fixed dimension lengthwise of the group. Cams 132 and 132a now begin to actuate the lever 136 as well as the one at the other side in a direction to cause the pusher bars 142–144 and 142a–144a to move forwardly to the dotted line portion shown in FIG. 8. At the same time, of course the clamp plates 198 and 198a carry the article group with them. During this operation the flap 158 is caused to swing downwardly to the dotted position shown in FIG. 8 by the movement of the cam follower 202 over the face of the fixed cam 204. The flap plate 174 also moves down to the dotted position but the indexing wheel 154 for that side of the machine is so timed as not to present a group of articles D to the clamp plates on the right hand side of the machine, as viewed in FIG. 8. The flaps 158 and 174 are shaped with offset ends as shown in FIG. 8, so as to form vertical extensions of the front and back walls of the box B and to if necessary, hold them at a maximum displacement so that the articles can drop as a group into the box. Prior to this however, the cam followers 184 and 184a have been moved inwardly by the cooperating cams 128 and 128a so that on continued forward movement of the pusher bars the cam followers 184 and 184a will engage the inner faces of the fixed camming surfaces 208 and 208a see FIG. 4. By the time the articles have reached a position to be released into the box the cam followers 184 and 184a move upon fixed camming surfaces 208 and 208a allowing the springs, like the spring 186, to move the clamp plates 198 and 198a outwardly to release the article group. This outward movement continues until the cam followers 184 and 184a engage the fixed cam surfaces 210 and 210a. At this time the cams 132 and 132a begin to return the pusher bars to their initial position ultimately bringing the cam followers 184 and 184a into cooperation with the related cam surfaces of the cams 128 and 128a.

It will be noted from FIG. 8 that the clamp plates are shaped so that they can have this outward movement without contacting the box. As soon as the articles are in the box the mechanism shown in FIG. 4 operates first to move the stop 30 out of engagement with the box B. This is accomplished through the coaction of the cam follower 50 with the cam 48. As the box is released the abutment 74a on the chain 74 engages the opposite end of the box and moves it to the right far enough so that it is engaged on its bottom face by means of the friction rollers 62. Since these rollers are revolving they move the box to the right in FIG. 5 far enough so that the stop 30 can move up between the rails to position a following box, which in the meantime is being fed by the conveyor 14.

It is obvious to those skilled in the art that this is a timed mechanism in which the successive functions of the machine are accomplished in the correct time sequence to assure smooth operation. The operation of the mechanism thus described for one side of the machine is timed in relation to the operation of the mechanism for the other side of the machine so that alternate boxes at the loading station will receive a group of articles from the opposite sides of the machine.

As previously mentioned, by changing the stop abutment 30 from its position on lever 58, see FIG. 6, to a corresponding position on lever 52, a shorter box adapted for six articles can be accurately positioned. In this case the mountings for the clamp plates 198 are extended sufficiently so that they can be moved to engage the shortened group, that is, a six-article group, in the same way that an eight article group was clamped.

Figure 9:
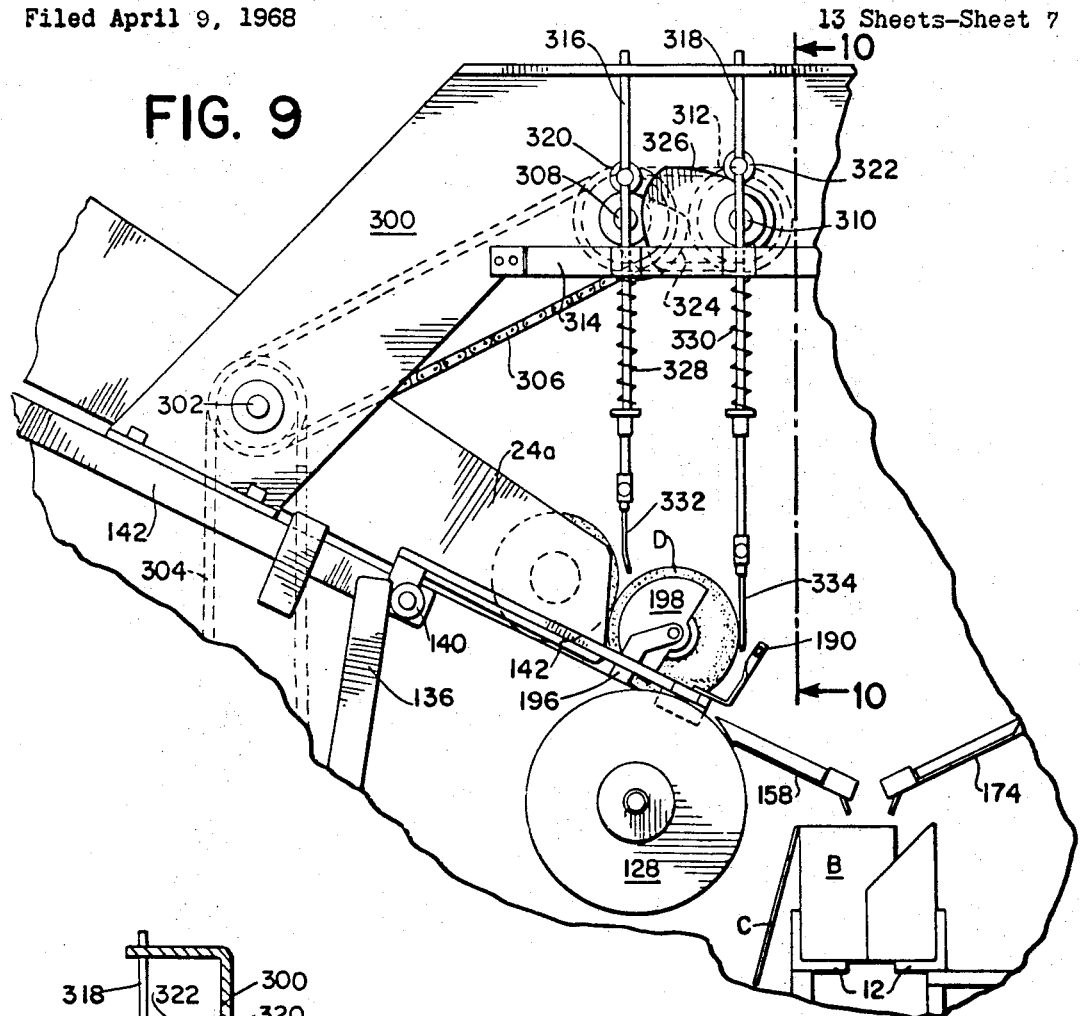
FIG. 9 is a side elevational view of an alternate form of mechanism for aligning the articles of a group prior to the movement of the group to a position above the box.
Figure 10:
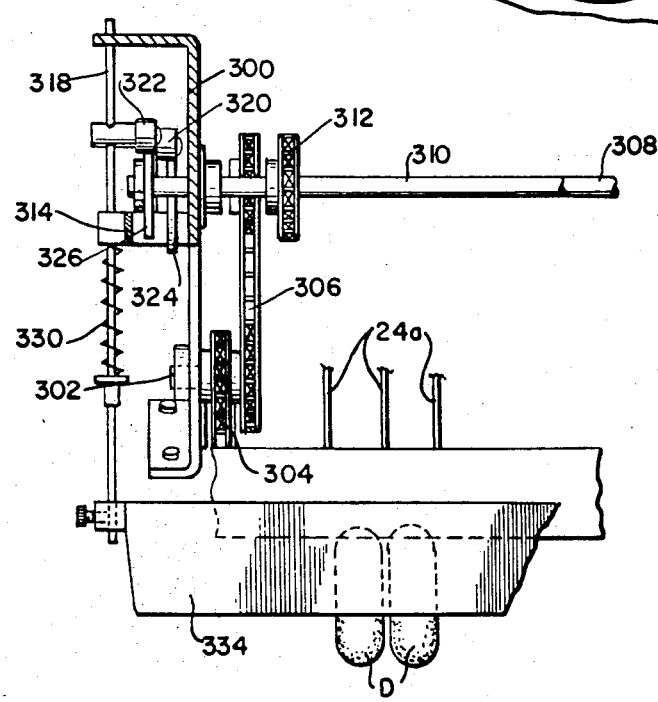
FIG. 10 is a view taken from the plane 10—10 of FIG. 9.

There is illustrated in FIGS. 9 and 10 an alternate mechanism for assembling the articles into groups. In this alternate arrangement a pair of reciprocable gates are used in place of the rotary indexing wheels 152 and 154 previously described. Where the same parts appear in the alternate arrangement, the reference numerals previously used are again used. The new alternate parts are provided with a new set of reference characters.

In this form of the device of pair of brackets 300 are secured to the machine frame in the region of the discharge ends of the partitions 24a. Mounted on this bracket is a stub shaft 302 carrying a pair of sprockets. One sprocket is driven by a chain 304 from any suitable power shaft of the mechanism and the other sprocket is connected by the chain 306 to a sprocket secured to a shaft 308. As seen in FIG. 9, shaft 308 is connected to shaft 310 through sprockets connected by the drive chain 312. As is clear from the figures the shaft 308 and 310 lie in a horizontal plane and extend transversely of the feed path of the articles across the ends of all of the partitions 24a. Secured to the outer face of the bracket 300 is a support 314, which together with the upper flange of the bracket 300, see FIG. 10, provide guiding supports for the reciprocable rods 316 and 318. These rods are provided with cam rollers 320 and 322, which cooperate respectively with the cams 324 and 326 secured respectively to the shafts 308 and 310. The rods 316 and 318 are provided with compression springs 328 and 330 which act to urge the rods downwardly thereby holding the cam followers in contact with the cams. Having in mind that there are rods corresponding to the rods 316 and 318 at the other side of the machine, it will be apparent that the vanes 332 and 334 may be secured thereto so as to lie across the path of movement of the articles from the chutes formed by the partitions 24a to the position of deposit into the box. The cams are shaped and relatively arranged so that when the vane 334 is down the vane 332 will be raised sufficiently so that the donuts D of a group can move out of the chutes into engagement with the vane 334. The next following group will move out then, but before the leading group is released by the vane 334 into contact with the rod 190 the vane 332 will move downwardly to a point which will prevent the next group from advancing until released. Thus, the vanes 332 and 334 are relatively reciprocated so that successive groups of articles can be assembled in alignment with the pressure plates 198. The mechanism shown in these two figures will, of course, be provided for the other side of the machine so that as in the previous case the groups of articles will be alternately delivered to the boxes from opposite sides of the rail 12.

The second embodiment of the invention is generally similar to that described above and is illustrated in FIGS. 11-18. However, since many of the mechanisms are changed it seems appropriate to use an entirely different series of reference characters and therefore the reference characters referring to this second embodiment start with the number 350.

As before, the machine comprises two substantially duplicate mechanisms located on opposite sides of a central longitudinally extending box feeding and removing mechanism. The loading position is at the center of the machine as indicated by the box B in FIGS. 12 and 13. The box B shown is of sufficient width to accommodate two donuts placed tangent to each other. These boxes are fed to and from the loading station along a pair of angle tracks 401 and 501 (FIGS. 12, 13 and 15) by means of chains 350 and 351.

Boxes are delivered in any suitable manner onto the tracks 401 and 501 so as to open upwardly, with the cover C extending upwardly. As a box is moved into the loading position the cover C engages a guide rod 352 (FIG. 12) which causes it to be rotated about the upper edge of the box to thus extend in a downwardly inclined position at the loading station as seen in FIG. 12.

As in the first embodiment, belt conveyors such as indicated at 16 in FIG. 1 (not shown in FIGS. 11–15) are arranged to carry donuts while in a horizontal position from a loading station in a direction parallel to the box feed, from which conveyors the donuts enter channels formed by partition walls 402 and 502, the curved bottom walls 403 and 503 of which serve to errect the doughnuts so that the peripheries thereof rest against the downwardly inclined support plates 404 and 504 while the sides loosely engage the partition walls 402 and 502.

Figure 12:
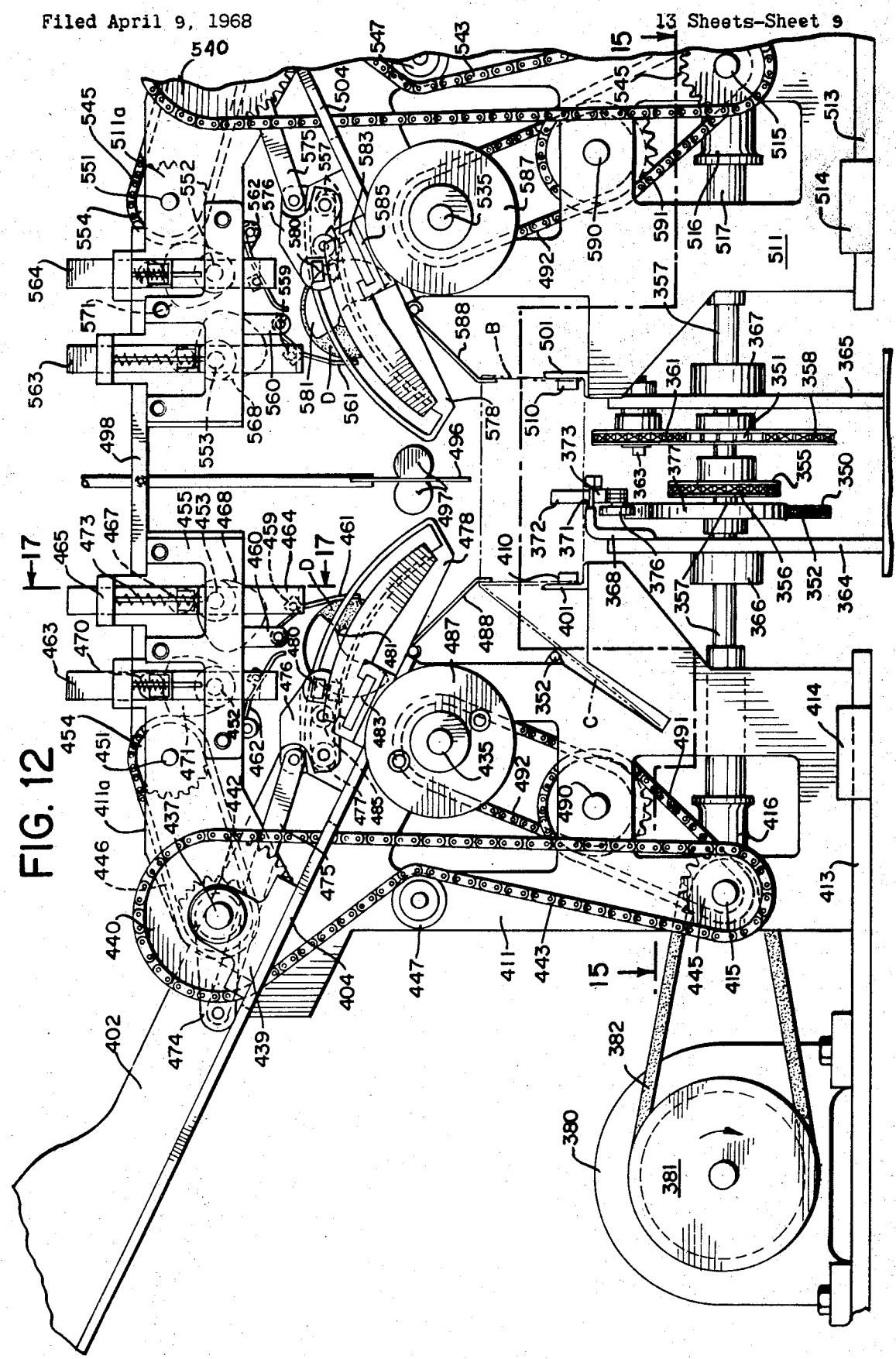
FIG. 12 is an end elevation of the machine of FIG. 11.
Figure 13:
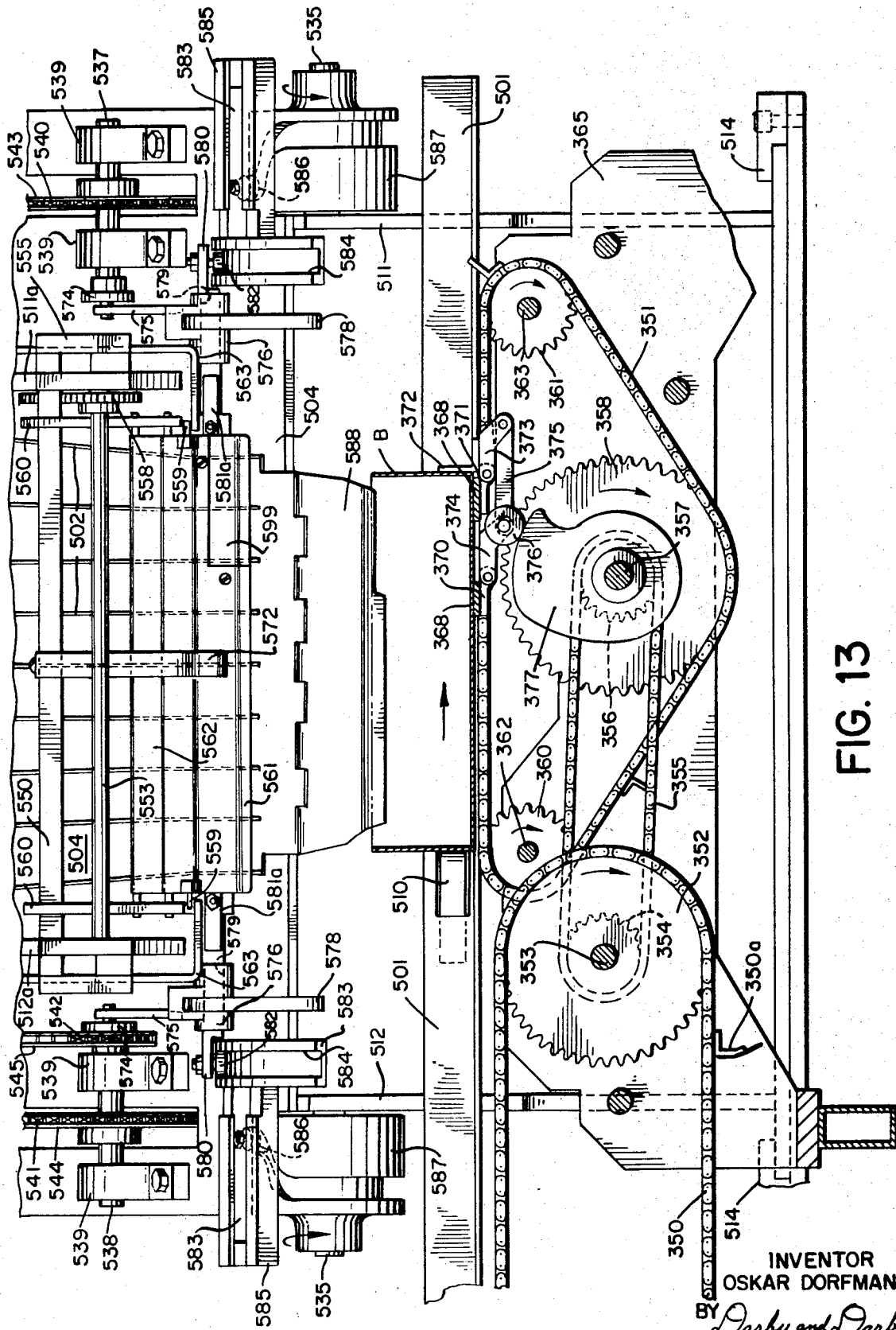
FIG. 13 is a vertical section substantially on the plane of the line 13—13 of FIG. 11.

Referring now to FIGS. 12 and 13, the box feeding conveyor chain 350 is provided with properly spaced lugs 350a adapted to extend upwardly between rails 401 and 501 to thereby engage boxes (ordinarily supply by a box erecting machine) and feed them successively to the loading position. Chain conveyor 350 is driven by means of a sprocket wheel 352 which is mounted on a shaft 353 on which is also fixed a sprocket 354.

Sprocket 354 is driven by a chain 355 which is driven by another sprocket 356 fixed to shaft 357, which shaft is driven in a manner shortly to be described.

Figure 15:
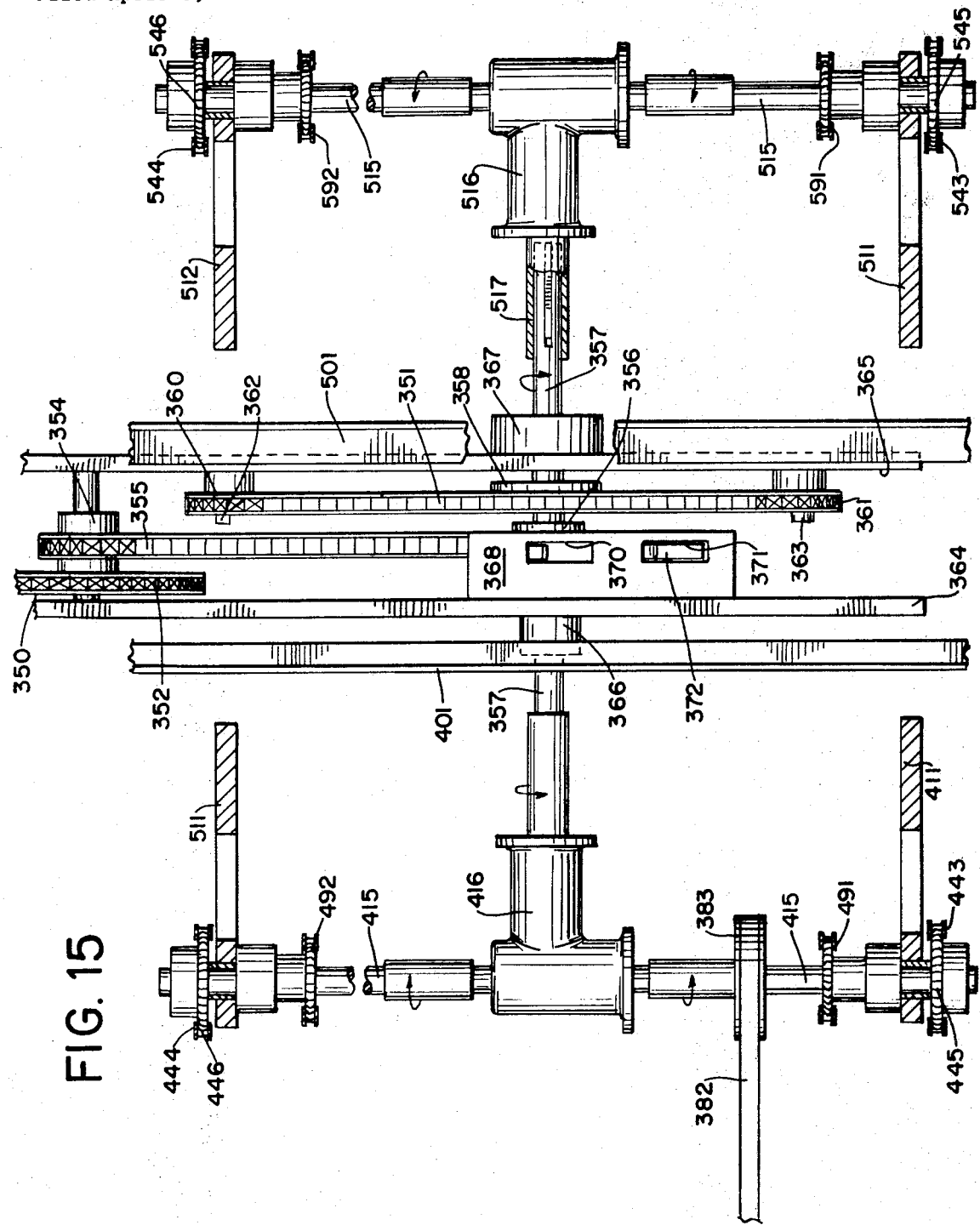
FIG. 15 is a fragmentary horizontal cross-sectional view taken on the plane of the line 15—15 of FIG. 12 and showing the drive shafts and their interconnections as well as the drive for the box conveyor chains.
Figure 16:
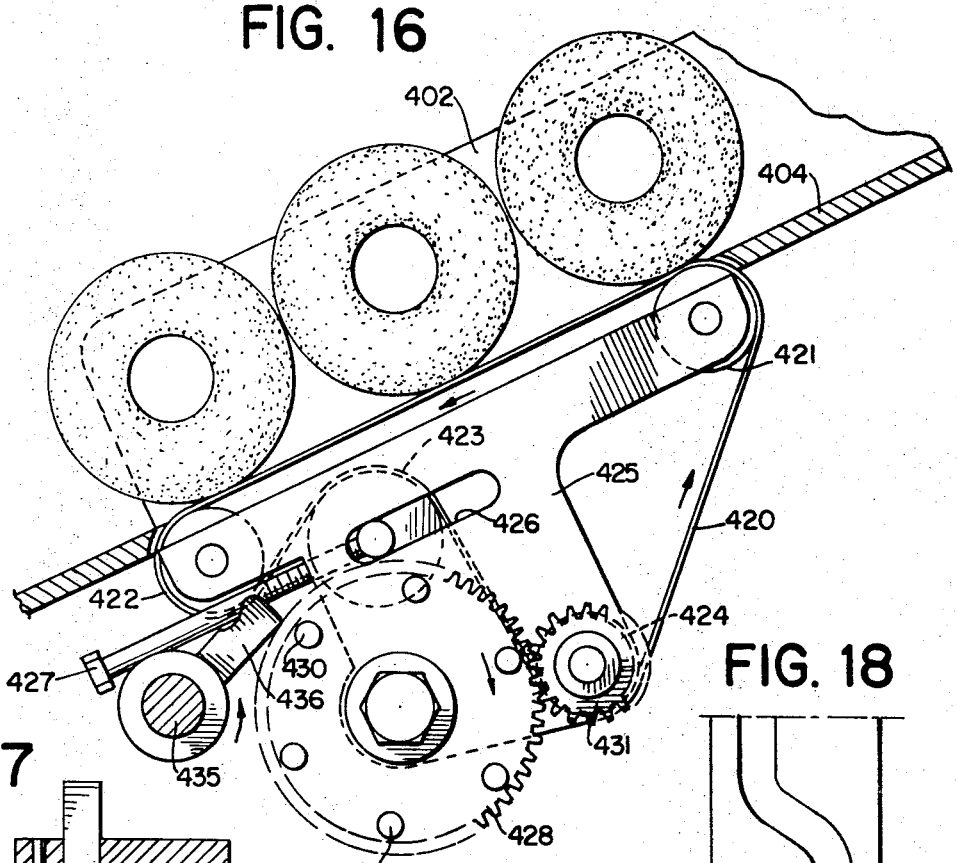
FIG. 16 is an enlarged fragmentary view taken on the plane of the line 16—16 of FIG. 11 and showing the drive mechanism for one of the donut feed belts.

As is apparent from FIGS. 13 and 15, the chain 351 is driven by the sprocket wheel 358 and extends over the sprockets 360 and 361, which sprockets are idler sprockets and are mounted on the stub shafts 362 and 363, respectively, fixed to the right-hand one of two plates 364 and 365, which plates also, by means of the bushings 366 and 367, carry the drive shaft 357.

The plates 364 and 365 are fixed in position, the duplicate halves of the machine being movable relative thereto, as will later appear. Fixed to the upper edge of the supporting plate 364 is angle piece 368, which piece has cutouts 370 and 371 therein (see FIG. 15) through which a box positioning lug 372 projects, it being understood that only one such lug will be utilized at a time. The lug 372 is mounted on the upper surface of one of the two links 373 and 374, which are pivotally mounted at their upper ends on the lower surface of the L-shaped piece 368. Joining the lower ends of links 373 and 374 is a link 375. A cam follower roller 376 is rotatably mounted at the lower end of the link 374, the roller being maintained by gravity against the surface of a cam 377 fixed to the drive shaft 357.

When the box stopping lug 372 is positioned on the link 373 as shown, a box of the length of eight donuts is stopped in position to be filled with either eight or sixteen donuts, whereas when the box to be filled is to contain either six or twelve donuts the lug 372 is positioned on the link 374. When six or twelve donuts are to be filled into a box rather than eight or sixteen donuts, certain other minor adjustments of the machine have to be made, as will be described later.

Mounted in openings in the rails 401 and 501 respectively are spring members 410 and 510 (FIGS. 12 and 13), which members incline toward the center line of the rails in a forward direction and then extend perpendicularly at their extreme forward ends. These spring members 410 and 510 thus are pushed aside by the box as it moves into loading position between the rails 401 and 501 and after the box is positioned so that its rear edge has passed the forward edge of the spring members 410 and 510 under drive of the lugs 350a, cam 377 causes the box stopping lug 372 to rotate in a counterclockwise direction and move the box back so that the rear edge seats against the forward faces of the spring members, resulting in an accurate positioning of the box to receive donuts as they are assembled and advanced into the box.

As indicated hereinabove, the machine consists of two essentially duplicate mechanisms, one located to the left and one to the right of the conveyor means, as seen in the drawings. Each of the duplicate mechanisms comprises frame members 411, 412 and 511, 512, respectively, which frame members are fixed to the respective base plates 413 and 513 and are spaced at their upper portions by the plates 404 and 504 and such other longitudinally extending braces as may be necessary to form a rigid structure.

As is clearly seen in FIG. 12, the base plates 413 and 513 are mounted for movement toward and away from each other in the guideways 414 and 514. As is also clearly seen in this figure, the L-shaped rails 401 and 501 are mounted on inwardly extending portions of the frame members and thus the guide rails may be moved toward and away from each other and toward and away from the center line of the belt conveyor by moving the duplicate mechanisms at the right and left of that center line toward or away from each other.

As seen in FIGS. 12 and 15, shafts 415 and 515 are journaled in the left and right frame members and extend longitudinally thereof. The shafts 415 and 515 are connected by means of beveled gearing placed in housings 416 and 516, respectively, to the shaft 357, the connection between the short shaft section 517 fixed to the right-hand bevel gear being through a cooperating spline formed on the outer shaft 517 and the inner shaft 357.

A main drive motor 380 drives a pulley 381 which through a belt 382 drives a pulley 383 on the shaft 415 and thus also shafts 357 and 517.

It will be seen from the above that the machine can be arranged to convey either single-width boxes or double-width boxes by moving the duplicate halves together or apart. Additionally, the phasing of the mechanisms of the left half with respect to those of the right half may be modified by moving the two portions sufficiently far apart to disconnect the splined sections of shaft 357 and 517 and then rotating the shaft 515 or the shaft 415 manually until a revolution has been passed through, thereafter re-engaging the shaft splines in the altered relationship. It is to be noted that as shown in the drawings, the mechanisms of the left and right sides are operated in phase and the base plates 413 and 513 are spaced apart so that the rails 401 and 501 accommodate a double-width box B.

Figure 14:
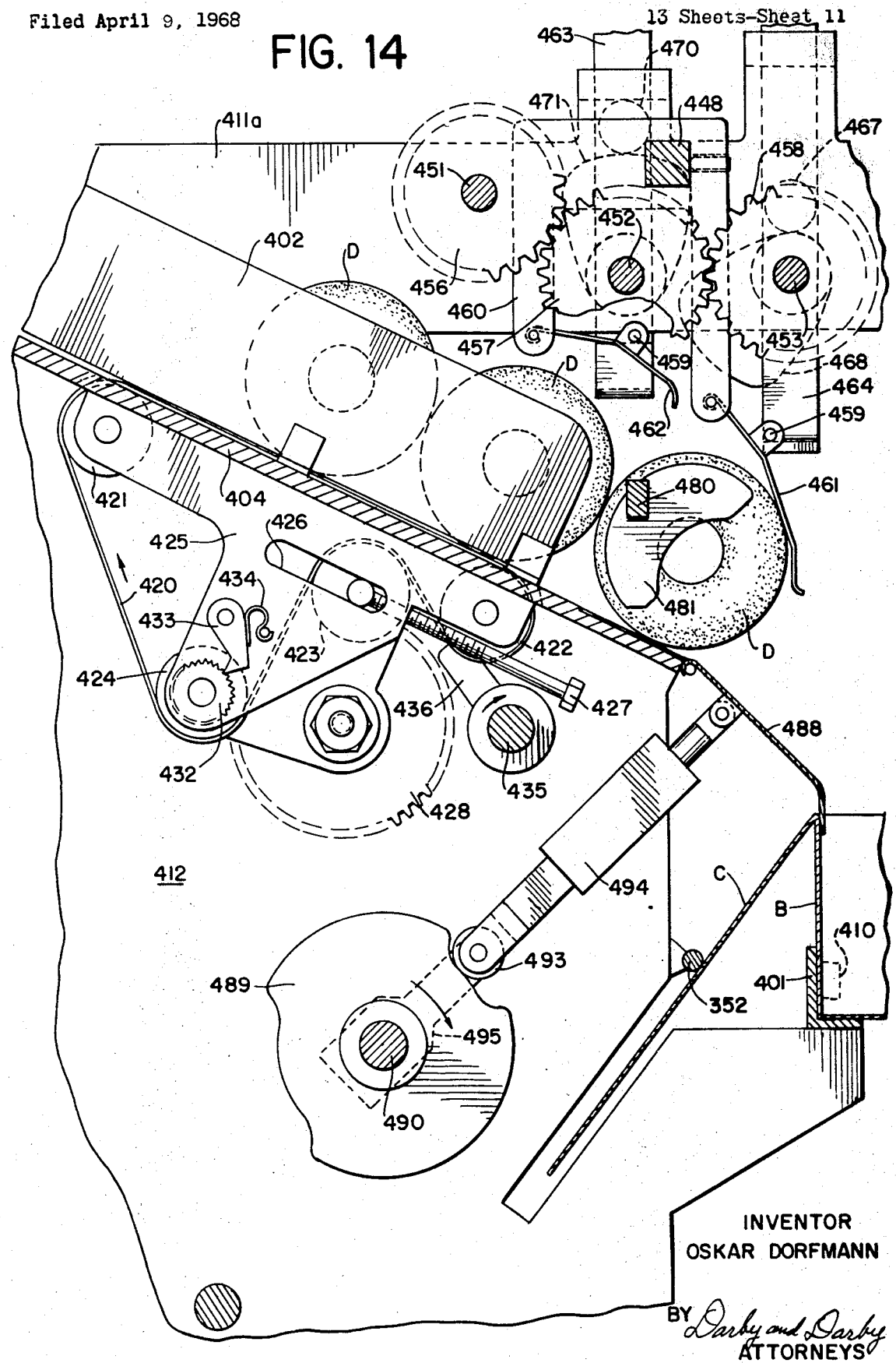
FIG. 14 is a fragmentary vertical cross section taken substantially on the plane of the line 14—14 of FIG. 11.

Referring now to FIGS. 12 and 14, and especially the latter, it will be seen that donuts, after being displaced into a verical plane, due to the shaping of the walls and bottoms of the chutes, are moved under the urger of gravity downwardly along the inclined plates 404 and 504. Plate 404 is cut out adjacent its lower ends and a belt such as belt 420 (FIGS. 11 and 14) is arranged in the opening to move the donuts positively downwardly through a donut diameter during each cycle of operation of the mechanism. The belt 420 is an endless belt and extends over rollers 421, 422, 423, and 424.

Rollers 421, 422, and 424 are mounted on shafts which are suitably supported in the brackets 425, which are in turn fixed to the undersurface of the plate 404 at the sides of the cutout portion. Roller 423 is supported on a shaft which is mounted in slots 426 in the brackets 425 and is adjustable by means of the screws 427 which are threaded into ears of brackets 425.

Mounted on an extension of one of the brackets 425 is a gear 428 (FIGS. 14 and 16) which gear has pins 430 spaced about the periphery of one face thereof and the teeth of which mesh with the teeth of a pinion 431 fixed on the shaft of roller 424. At the opposite end of the roller 424, is a ratchet 432 against which a retaining pawl 433 is urged by the spring 434 to thus hold the belt in a particular position.

For each rotation of a shaft 435, the gear 428 is moved through a predetermined fraction of a revolution. As is seen in FIG. 12, shafts 435 (and 535, its equivalent on the right-hand side) extend between the corresponding frame-plates 411, 412, 511, and 512. Fixed to each of the shafts 435 adjacent to the pins 430 and in position to make contact with those pins is an arm 436 which, as the shaft 435 turns through a revolution, advances the gear through the predetermined fraction of a revolution and drives the roller 421 and hence the belt 420 through a predetermined amount which in this instance is the diameter of a donut. It will of course be understood that the mechanism on the other side of the machine is identical but is not shown in detail.

Movement of donuts is controlled by the belts as just described and also by gates which open and close in timed sequence so that groups of donuts are stopped in position to be engaged by axially movable pressure plates which thereafter carry the donuts into position in the boxes. The gates and their operating mechanism are shown in detail for the left side of the machine only, in FIG. 14, but are shown in less detail for both sides of the machine in FIG. 12.

Mounted at the sides of plates 404 and 504 are bearing brackets such as those designated 439 and 539. Mounted in the bearings of these bearing brackets are short shafts 437, 438 and 537, 538. Shafts 437 and 537 carry a single sprocket wheel 440 or 540, while shafts 438 and 538 carry two sprocket wheels 441, 442 and 541, 542, respectively.

Sprocket wheels 440, 441 and 540, 541 are driven by shafts 415 and 515 through the medium of chains 443, 444 and 543, 544, the chains being in turn driven by sprockets 445, 545, each chain passing over an idler such as those illustrated in FIG. 12 at 447 and 547.

Brackets 411a and 412a are joined together by the bars 448 and brackets 511a and 512a are joined in a similar manner as is indicated in FIG. 12 for the bar 550. Extending between the brackets 411a, 412a and 511a, 512a, are a number of shafts designated 451, 452, 453 and 551, 552, 553. Shafts 451 and 551 carry at their rear ends (upper end as seen in FIG. 11) sprocket wheels designated respectively 454 and 554, these sprocket wheels being driven from the sprocket wheels 442 and 542 by means of chains 446 and 546. Mounted on the forward end of shaft 451, is a gear 456, which meshes with and drives a gear 457 on shaft 452, which in turn meshes with and drives a gear 458 on shaft 453.

Pivotally mounted in brackets 460, 560 fixed to the bars 448, 548, at each end thereof are gates 461, 462, 561, 562, which gates extend transversely across the path of the donuts D and stop them in predetermined positions. Mounted at each end of each of the gates is a pin 459 or 559 which extends outwardly, underlying portions of reciprocating gate operating members designated 463, 464, 563, 564.

Figure 17:
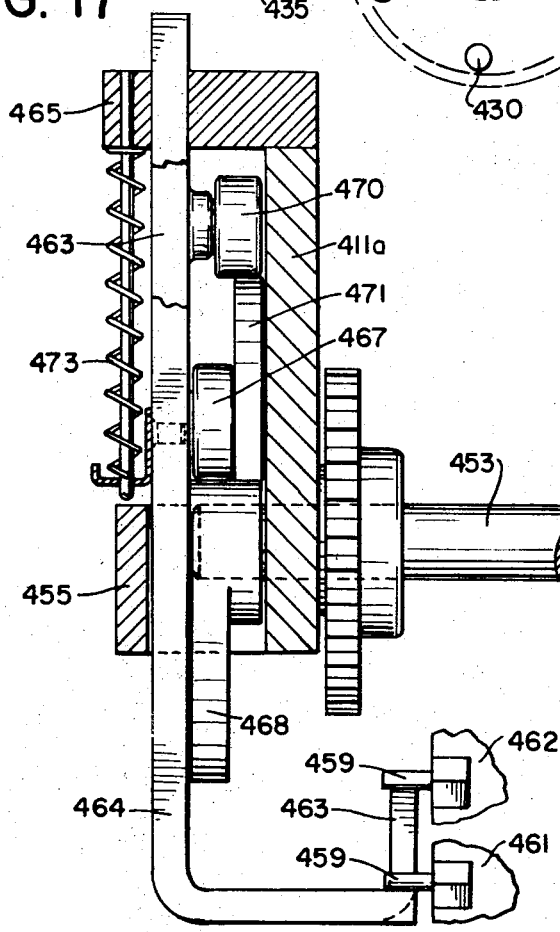
FIG. 17 is an enlarged fragmentary vertical cross-sectional view taken on the plane of the line 17—17 of FIG. 12 and showing the cams for controlling opening and closing of the donut gates.
Figure 18:
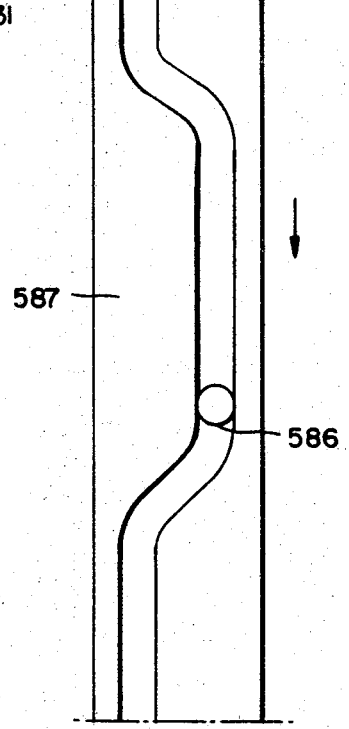
FIG. 18 is a developed view of the cam for controlling the axial position of one of the donut pressure plates.

Referring now to FIG. 17 as well as to FIGS. 12 and 14, it will be seen that the gate operating members are mounted in guides such as 455 and 456 fixed to corresponding brackets such as 411a and 412a for reciprocating vertical movement. It will be realized that gate operating members 463 and 464 are supplied at both ends of the machine and that similar gate operating members 563 and 564 are supplied at the other side of the mechanism (see FIGS. 11 and 12). Gate operating member 464 carries a cam follower 467 which cooperates with a cam 468 on shaft 453. The operating member 464 has an inwardly extending bent portion at its lower end, which underlies one of the mentioned pins 459 extending outwardly from the gate 461. In a similar manner, the gate operating member 463 carries a cam follower 470 which cooperates with a cam 471 carried by the shaft 452. The gate operating member 463 extends downwardly, thence outwardly, and has a turned-up portion at its right-hand end as seen in FIG. 17, the edge of the turned-up portion cooperating with the pin 459 extending outwardly from the gate 462.

Referring now particularly to FIG. 11, it will be seen that there are fixed to the bars 448 and 548 respectively near the centers thereof leaf springs 472, 572, one end of which urges the forward gates 461 and 561 into closed position, and the other end of which serves the same function with respect to the rearward gates 462, 562. It should also be noted at this time that the gate operating members 463 and 464 are urged to their lower positions by means of springs such as 473 extending between the upper guide members 464 and brackets fixed to the gate operating members (FIG. 17).

As has been indicated, donuts which are properly aligned in an assembled group by the forward gates 461 and 561 are pressed axially by pressure plates and are moved downwardly in a generally arcuate path into boxes at the loading station, these movements of the pressure plates inwardly against the donuts and downwardly to the loading station being likewise performed in timed sequence to the other mechanisms discussed and to the movement of boxes into and away from the loading position.

Referring now to FIGS. 11, 12 and 13, it will be seen that each of the shafts 437, 438 and 537, 538 has fixed thereto at the inner end thereof a crank arm 474 or 574. Pivoted to each crank arm 474, 574 is a connecting rod 475, 575 which is in turn pivotally connected to a block such as 476, 576 provided with rollers 477, 577 cooperating with arcuate slots in the bracket members 478, 578, the bracket members being fixed to the plates 404, 504. Extending through a rectangular bore 479, 579 in the block 476, 576 is a rod 480, 580 which has fixed thereto at its inner end by any suitable means such as an extension 481a and suitable screws, an arcuate pressure plate 481, preferably coated with Teflon. Rods 480, 580 have rotatably mounted thereon and extending downwardly from their outer ends, follower rollers 482, 582.

It will be obvious from the above that as the shafts 437, 438, 537, 538 are rotated, the corresponding crank arms cause a reciprocating movement of the rods 480, 580 in arcuate paths determined by the slots in the brackets 478, 578.

The rollers 482 and 582 extend into arcuate grooves 484, 584 in slide members 483, 583, portions of which are mounted for reciprocatory movement in guides 485, 585 fixed to the plates 404, 504. Cam rollers 486, 586 mounted on the lower sides of the slides 483 operate in grooves in box cams 487, 587, these cams being mounted on shafts 435 or 535 as the case may be. Shafts 435 and 535 are driven through the medium of sprockets and chains at the same speed as the shafts 437, 438, that is to say, at one-half the speed of the shafts 415 and 515.

Thus, as the machine operates through a cycle, the arcuate pressure plates 481, which are preferably formed of nylon, are moved inwardly, downwardly, and outwardly and then back to the starting position. Although the shafts 435 and 436 are operating synchronously, as described, there is very little movement in the upward or downward direction of the pressure plates at the time when they are moving either inwardly or outwardly, this being due to the fact that the movement produced by the crank arm is of course simple harmonic motion, whereas the movement produced by the cam track is not. Also, as is clear by reference to the developed view of one of the cams 587 in FIG. 18 (the left-hand one as seen in FIG. 13), the outward movement is made more rapid than the inward movement. This is done in order to assure that the pressure plates will not stick to the donuts and that the donuts will not stick to each other. By having a rapid breakaway action, this detrimental condition is overcome and the donuts, even though they may be, for example, chocolate covered, do not stick to the pressure plates and do not stick to each other and thereby tend to tear the chocolate coating from the surfaces of the donuts. On the other hand, by making the exertion of axial pressure on the donuts gradual, breakage thereof is reduced or eliminated.

As has been indicated, donuts positioned by the gates 461, 561 are, by the mechanism described, compressed axially and moved through an arcuate path to a position wherein the lower edges of the donuts are within the box.

Referring now to FIGS. 12, 13 and 14, it will be seen that a flap 488 or 588 is pivoted to the bottom of the respective plate 404 and 504. The flaps 488 and 588 have offset ends, as shown particularly in FIG. 12, which ends, as discussed in connection with the first embodiment of the invention, serve to enter the box, assuring that the box sides are spread and guiding the donuts into the box. The flaps move up and down during the cycling of the machine under control of cams such as 489 (only one side of the machine is shown in FIG. 14), which are mounted on shafts 490 or 590 driven by means of chains 491 or 591 (FIG. 12) at half the speed of the shaft 415 or 515.

Shafts 435 and 535 are similarly driven by means of chains 492 or 592 at the same speed as shafts 490 or 590 so that the shafts 490, 590 and 435, 535 operate in synchronism.

As is clearly seen in FIG. 14, cam 489 is provided with two lobes, one of less circumferential extent than the other. When the machine halves are operating in phase, the two cams are located so that the cam followers such as 493, through the medium of links such as 494, carried by guides 495 mounted on shaft 490, operate the flaps 488 and 588 simultaneously. When the two duplicate mechanisms are operating in phase, a divider plate 496 is positioned between the flaps 488 and 588. This divider plate carries generally semicircular axially extending projections 497 which act as aligning stops as the donuts move downwardly into the box. Plate 496 is supported by a suitable framework 498 on the laterally extending bars 448 and 548 (FIGS. 11 and 12).

When the mechanisms are placed 180° out of phase, as heretofore mentioned, the flap cams such as 489 are out of phase, so that the flap on the side at which donuts are being loaded at that moment is lowered for a longer period of time, and during that longer period of time the flap on the opposite side is lowered and thus serves first as an aligning stop for the donuts, and thereafter moves out of the way of the donuts and guides them into the box. In this case of course, the center partition plate 496 is removed.

Also, when the machine shown in FIGS. 11 through 18 is utilized for loading single-row boxes alternately from opposite sides, a box is supplied to the loading station twice during each machine cycle, one of each two boxes being loaded by operation of the left-hand side of the machine, and the second being loaded by operation of the right-hand side of the machine. Also, in this case the boxes are removed at twice the rate, that is, each lug 351a of the chain 351 engages a box and moves it out of the machine, whereas when double-row boxes are being loaded, only every other box is supplied to the box feeding conveyor chain 350 and therefore only one of the two lugs 351a is then effective in removing boxes from the loading station.

It should also be noted that when short boxes are used, whether they be single or double-row boxes, the stops 372 are mounted on the rearward links 374, two donut chutes 402, 502 are blocked off, the pressure plates 481, 581 at one end are moved inwardly of rods 480 and 580 (by use of longer supports) and the gates 461 and 561 have portions (refer to FIG. 13) 599 removed therefrom.

Although the operation of the second embodiment of this invention is believed clear from the description heretofore given, a brief resume of that operation is set forth below.

Donuts are fed to both sides of the machine on horizontally extending conveyor belts which feed these donuts into inclined chutes. At the moment of feeding into the chutes the donuts are horizontal but since the chute bottoms are curved as described, the donuts became erect, standing on edge, each donut being guided by vertical chute walls downwardly into position ajacent the rearward gate. As the machine operates, the rearward gates release groups of donuts which are positively moved downwardly by belt conveyors located in the plane of a platform on which the donuts previously rested. Thus as the rearward gates are operated, lines of donuts are moved into position behind the forward gates.

Thereafter, pressure plates are moved inwardly axially of the assembled group and compress the donuts which have now passed beyond the edges of the chutes. The groups of donuts are then advanced over a generally arcuate path until the lower portion of the donuts is within a box. During the latter portion of this advance the box has been opened by means of flap ends which extend thereinto, and donuts have been aligned against a central plate. After the donuts are in the position mentioned, the pressure plates move rapidly outward, releasing the donuts into the box. The flaps move upwardly and the exit conveyor, after a stop has been removed from the path of the box, causes the loaded box to be moved away from the loading station and out of the machine.

It is to be understood that although two major embodiments of the invention have been described, and modifications of various of the mechanisms have also been set forth, there are many other embodiments and mechanism modifications which might be made. I wish therefore to be limited not by the foregoing description, but on the contrary, solely by the claims granted to me.

What is claimed is:

1. In a machine for assembling donuts and the like into groups arranged side by side and comprising a predetermined number per group and depositing the groups into boxes held at a loading station during movement through the machine, in combination, a box conveyor, means for holding boxes fed by said conveyor at a loading station therealong for a predetermined time, a pair of substantially duplicate donut assembling and depositing mechanisms, one located at each side of the longitudinal center line of said box conveyor at said loading station, means for feeding donuts to said assembling mechanisms and means for operating said box conveyor and said assembling and depositing mechanisms in timed relationship to thereby deposit at least one assembled group of donuts in each of a succession of boxes held at said loading station, each said assembling mechanism comprising a plurality of inclined chutes having a common bottom and vertical walls spaced apart the diameter of a donut at their entrance ends, and curved to lie substantially the thickness of a donut apart at their lower ends, and means for erecting donuts as they pass down the chutes, said erecting means comprising platforms lying above the common chute bottom, said platforms terminating at their forward ends in curves extending from one side of each chute to the other to thereby cause a donut to move under gravity to an erect position in the narrow portion of the respective chute.

2. A machine as claimed in claim 1 wherein said depositing mechanism comprises means for aligning the assembled erected donuts in a longitudinally extending group on their common axis, pressure plates reciprocable to and from a position to exert pressure against the end ones of said assembled donuts, means reciprocating said plates, means moving said plates along a generally arcuate path from said aligning position to a position with the lower portion of the donuts of a group inserted into a box at said loading station and means for controlling said pressure plate reciprocating means to release donuts when the lower portions thereof are inserted in a box.

3. A machine as claimed in claim 1 to wherein each of said duplicate mechanisms comprises a rail extending longitudinally at one side of said box conveyor, said pair of rails being adapted to support a box to be moved by said conveyor, and means comprising a lug positionable to stop a box at a loading position, each said rail having a spring member fixed thereto and inclining in the direction of travel of boxes, said spring members having ends bent substantially perpendicular to said inclined portions, said spring ends engaging the trailing end of a box after it passes said inclined portions and cooperating with said lug to maintain the box in a predetermined position.

4. A machine as claimed in claim 1 wherein each said assembling and depositing mechanism further comprises gate means for restraining and aligning the assembled erected donuts of a group, pressure plates for gripping an aligned group of donuts and moving them to position above a box at the loading station, a flap means pivoted to the platform of each said mechanism, said flap means having offset ends to enter and spread the box sides prior to entry of said donuts, and means to oscillate said flap means about an upper position in which the flap is substantially an extension of the platform and said box side spreading position at least twice during each cycle of operation of the said duplicate mechanism, and means comprising a plate supported on said duplicate mechanisms and extending between them above a box at said loading station, said plate having projections extending axially therealong and cooperating with said depositing mechanism to align and guide two groups of donuts into a double-row box at said loading station.

5. A machine as claimed in claim 1 wherein each said assembling and depositing mechanism further comprises gate means for restraining and aligning the assembled erected donuts of a group, pressure plates for gripping an aligned group of donuts and moving them to a position above a box at the loading station, a flap means pivoted to the platform of each said mechanism, said flap means having offset ends to enter and spread the box sides prior to entry of said donuts, and means to oscillate said flap means about an upper position in which the flap is substantially an extension of the platform and said box side spreading position at least twice during each cycle of operation of the said duplicate mechanism, said flap of a first one of said duplicate mechanisms serving to momentarily align and thereafter guide donuts from the second of said duplicate mechanisms into a box at the loading station, said flap of said second duplicate mechanism serving to momentarily align and thereafter guide donuts from the first of said duplicate mechanisms into a second box at the loading station during a following half-cycle of the machine.

6. A machine as claimed in claim 1 wherein each said assembling and depositing mechanism further comprises gate means for restraining and aligning the assembled erected donuts of a group, pressure plates for gripping an aligned group of donuts and moving them to position above a box at the loading station and a flap means pivoted to the platform of each said mechanism, said flap means having offset ends to enter and spread the box sides prior to entry of said donuts, and means to oscillate said flap means about an upper position in which the flap is substantially an extension of the platform and said box side spreading position at least twice during each cycle of operation of the said duplicate mechanism.

7. A machine as claimed in claim 6 wherein said pressure plate reciprocating means moves said plate inwardly and causes gradual compressing of the donuts as said pressure plate moving means is substantially stationary, maintains said pressure during operation of said moving means toward said loading station, causes rapid outward motion to rapidly release said pressure when said moving means are adjacent said loading position and maintains said outward position as said moving means returns to the initial position.

8. A machine as claimed in claim 6 wherein said pressure plates are coated with a nonstick substance.

9. A machine as claimed in claim 1 further comprising means for operating said duplicate mechanisms in a predetermined phased relationship to deposit the groups of assembled donuts into boxes from each of said duplicate mechanisms according to a preselected pattern.

10. A machine as claimed in claim 9 further comprising means for selectively repositioning said duplicate mechanisms relative to each other, said mechanisms thereby being selectively adapted to assemble and depost two groups of donuts either substantially tangential to each other side by side in two-row boxes or end to end in single-row boxes.

11. A machine as claimed in claim 10 wherein said repositioning means comprises a drive means for each said duplicate mechanism, motor means for driving one of said mechanisms and means to engage the other drive means with said one drive means in a desired phase relationship, said engaging means including a pair of axial aligned telescoping splined shafts.

References Cited

UNITED STATES PATENTS

| 1,591,949 | 7/1926 | Anderson | 53—159 |
| 2,332,315 | 10/1943 | Harber | 53—159 XR |
| 2,656,656 | 10/1953 | Murdoch et al. | 53—124 XR |
| 2,907,159 | 10/1959 | Allen | 53—251 XR |

THERON E. CONDON, Primary Examiner

R. L. SPRUILL, Assistant Examiner

U.S. Cl. X.R.

53—154, 159, 168, 237, 251